July 19, 1966     H. E. MARTIN     3,262,016
LOAD PROTECTOR
Filed Aug. 21, 1962
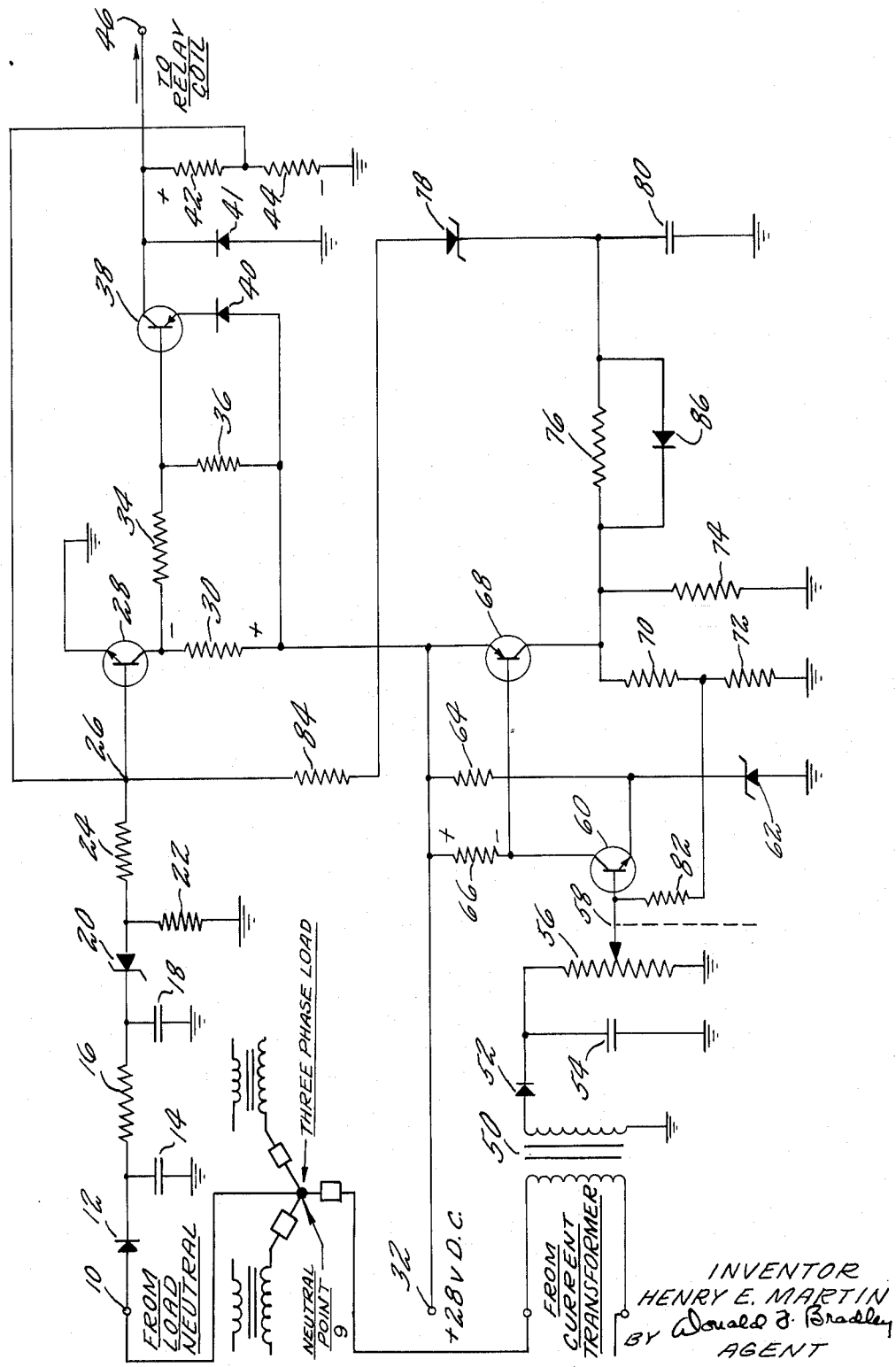
INVENTOR
HENRY E. MARTIN
BY Donald J. Bradley
AGENT

United States Patent Office 3,262,016
Patented July 19, 1966

3,262,016
LOAD PROTECTOR
Henry E. Martin, Wapping, Conn., assignor to United Aircraft Corporation, East Hartford, Conn., a corporation of Delaware
Filed Aug. 21, 1962, Ser. No. 218,264
6 Claims. (Cl. 317—33)

This invention relates to a circuit protection system, and particularly to an electronic circuit which senses unbalanced voltages or excessive currents in a motor or load and produces a corrective action to thereby prevent motor or load burnout or damage. In particular, the protector will sense unbalanced three-phase voltages and over-current conditions and initiate corrective action immediately.

The three-phase circuit protector of this invention has universal application for any three-phase circuits, and can also be employed on single-phase circuits. To sense the unbalance voltage level of any three-phase circuit, the protector is connected to the neutral or simulated neutral of the circuit. When the voltage at that point exceeds a preset maximum, the protector produces a signal which can be used to operate a relay and open or close any desired circuit. A phase current load is sensed by a current transformer placed on one line of the load so that when an overcurrent occurs, the load is tripped off the line. The overcurrent sensing portion of the protector utilizes an inverse time constant which results in a higher overcurrent condition producing a shorter trip time. This is especially useful for short-circuit protection and loss of one phase of the three phase-line.

An important feature of the protector is that the allowable unbalanced voltage and/or current levels may be varied to suit each application by simply changing a reference or adjusting a potentiometer to determine the reference point for sensing overload or unbalance conditions.

Another important feature of the protector is that the motor or other type of load may be reconnected immediately after an overcurrent. A bypass is provided for the time delay circuit to immediately allow discharge of the capacitor and reconnecting of the load.

The protector circuit of this invention is completely transistorized and draws very little power. In addition to being light, sturdy and compact.

It is therefore an object of this invention to provide a three-phase load protector which responds to unbalanced three-phase voltages and overcurrent conditions and initiates corrective action.

Another object of this invention is a three-phase load protector in which an inverse time constant is provided to control the actuation of the protector.

A further object of this invention is a three-phase load protector in which a load may be reconnected immediately after an excessive current condition has caused disconnection of the load.

These and other objects and a fuller understanding of the invention may be had by referring to the following description and claims read in conjunction with the accompanying drawing which illustrates an embodiment of the invention.

Referring to the figure, junction 10 will be connected to the neutral 9 or simulated neutral of the load. It is immaterial whether the three-phase output is connected in delta or wye or any other output arrangement as long as a neutral is available. A balanced load or a load with no opened or shorted connections will result in a substantially zero voltage at terminal 10. If a malfunction occurs, such as one of the phases opening or shorting, an A.C. voltage will be produced at terminal 10. The A.C. is then conducted through a diode 12 where it is rectified and the D.C. ripple is smoothed by capacitor 14. An integrator circuit comprising a resistor 16 and a capacitor 18 is connected to receive the D.C. voltage. The integrator network provides a time delay to the D.C. voltage and prevents the full voltage from being applied to zener diode 20 instantaneously. Zener diode 20 will normally be nonconducting, and will not conduct until the voltage at junction 10 reaches the breakdown voltage of the diode. The integrator network 16 and 18 will allow a high voltage at junction 10 for a short time without breaking down zener diode 20. The RC time constant of the integrator will normally be small, for example between 25 ms. and 1 sec. depending on the unbalance which can be withstood by the motor or load without detrimental effects.

When the voltage applied to junction 10 exceeds the breakdown voltage of zener diode 20, the diode conducts and a voltage passes through the diode and across a voltage divider network 22 and 24 to junction 26. The base junction of n-p-n transistor 28 is connected with junction 26, and the emitter of transistor 28 is grounded. Breakdown of zener diode 20 will result in a positive voltage at junction 26, thereby causing transistor 28 to conduct. The collector of transistor 28 is connected through a resistor 30 to a source of D.C. voltage at junction 32. Conduction of transistor 28 will result in current flow through the transistor and a voltage polarity across resistor 30 as indicated in the figure. The collector voltage is fed across a voltage divider comprising resistors 34 and 36 and feeds the base junction of p-n-p transistor 38, causing transistor 38 to turn on. A diode 40 is connected in the emitter circuit of transistor 38 to provide a high emitter impedance when the transistor is in the off state to minimize the effects of leakage.

When transistor 38 conducts, current flows through the transistor and across collector load resistors 42 and 44. A diode 41 is connected between ground and the collector of transistor 38 to absorb the inductive energy of the output relay when it is deenergized. The load resistors provide an output voltage at junction 46. Junction 46 may be connected to a relay coil or other network which will shut down the motor or disconnect the load. The voltage appearing at the junction of resistors 42 and 44 is fed back to the base of transistor 28 to provide an electrical latching means.

The portion of the circuit previously described protects only against voltage unbalances produced by shorting out or opening of any phase of a three-phase voltage. Overcurrent may be sensed by connecting a current transformer 50 on the line of the load. The load current is transformed across transformer 50 to the proper voltage level and rectified to D.C. by diode 52. A smoothing capacitor 54 eliminates some of the D.C. ripple. The D.C. voltage is then fed across a potentiometer 56 where the desired portion of the voltage is picked off by the adjustable arm 58 of potentiometer 56 which thereby allows the reference voltage to be varied. The voltage picked off by arm 58 is fed to the base junction of n-p-n transistor 60. The emitter of transistor 60 is connected to ground through a zener diode 62. Diode 62 is normally biased beyond its breakdown region by D.C. voltage source 32 through resistor 64 and is therefore continuously conducting in the reverse direction. The zener diode 62 is therefore used to supply a fixed potential to the emitter of transistor 60, and it is obvious that any other arrangement such as a battery may be used. The conduction point of transistor 60 may be changed by varying either arm 58 or the zener diode 62.

When the current from the current transformer exceeds a predetermined level, transistor 60 will conduct producing a voltage drop across collector load resistor 66. The voltage drop across resistor 66 is fed to the base of p-n-p transistor 68 and will render transistor 68 conductive. When transistor 68 conducts, a voltage drop is produced across parallel resistors 70 and 72 and resistor 74, and this voltage is connected through series resistor 76 to the cathode of zener diode 78. A capacitor 80 is connected between the cathode of diode 78 and ground, and resistor 76 and capacitor 80 form an integrating network with a time constant in the order of 4 sec. or more. The voltage at the junction of resistors 70 and 72 is fed through resistor 82 to the base of transistor 60 to provide electrical latching means. When the collector voltage of transistor 68 exceeds the breakdown voltage of diode 78 for a time sufficiently long to fully charge capacitor 80, diode 78 will break down and current will flow through diode 78 and resistor 84 and produce a voltage at junction 26 to actuate transistor 28. At this point, the action of the remaining circuitry is similar to that described above, and an output voltage to a relay or other output device appears at junction 46.

A diode 86 is connected across resistor 76 in a direction that will not pass current when transistor 68 is turned on. However, when capacitor 80 becomes charged to positive voltage and transistor 68 is turned off because the current overload has subsided, capacitor 80 will discharge through diode 86 and resistor 74. Diode 86 is thus a high impedance to the charging of capacitor 80 and a low impedance when the overcurrent is removed. The rapid discharge of capacitor 80 enables the circuit to function almost immediately after a malfunction occurs because there is no delay involved in waiting for capacitor 80 to discharge.

Transistors 38 and 68 are used both for power amplification and for phase reversal of the signals from switches 28 and 60. When transistor 60 is turned on, transistor 68 conducts to provide a constant output voltage to be fed across the integrator 76 and 80. Thus, any time transistor 60 is turned on, zener diode 78 will conduct shortly thereafter the time depending on the time constant of the integrator network. If the overcurrent subsides within the time constant period, transistors 60 and 68 are turned off and zener diode 78 will not conduct. Capacitor 54 and potentiometer 56 may also serve as an integrator network to allow transistor 60 to switch sooner when a high overcurrent is present. In this way, the amount of overcurrent does, in a limited way, affect the time of response, but the use of integrator 76 and 80 provides a time delay before zener diode 78 conducts.

It is to be understood that the invention is not limited to the specific embodiment herein illustrated and described, but may be used in other ways without departure from its spirit as defined by the following claims.

I claim:
1. A protector circuit for a three-phase circuit having a neutral point,
   sensing means connected to the neutral point of said three-phase circuit for sensing the unbalance of said circuit and producing a first A.C. signal,
   means responsive to said first A.C. signal for producing a first D.C. signal whose magnitude is representative of and proportional to said first A.C. signal,
   means for sensing the current of one phase to produce a second A.C. signal representative of and proportional to said phase current,
   rectifying means receiving said second A.C. signal to derive a second D.C. signal proportional to said second A.C. signal,
   a first circuit means responsive to either said first or second D.C. signals for producing an output signal, and
   positive feedback means connected between the output and the input of said first circuit means.
2. A protector circuit for a three-phase circuit having a neutral point,
   means connected with said neutral point for sensing a first A.C. signal representative of the unbalance of said three-phase circuit,
   first rectifying means for receiving said first A.C. signal and converting said first A.C. signal to a first D.C. signal,
   conducting means responsive to said first D.C. signal and conducting when said D.C. signal exceeds a predetermined maximum permissible value,
   delay means interposed between said rectifying and conducting means for effecting a time delay of said first D.C. signal,
   phase current sensing means connected with said circuit and producing a second A.C. signal representative of and proportional to said phase current,
   second rectifying means connected to said phase current sensing means and deriving a second D.C. signal whose magnitude is proportional to said second A.C. signal,
   a reference signal,
   transistor switching means connected to said reference signal and said second D.C. signal and producing a third D.C. signal when the magnitude of said second D.C. signal exceeds the magnitude of said reference signal,
   output circuit means responsive to either said first or said third D.C. signal for producing an output signal, and
   positive feedback means connected from said output signal to the input of said output circuit means.
3. A protector circuit for a three-phase load having a neutral point,
   means connected with said neutral point of said load for sensing a first A.C. signal at said neutral point,
   first rectifying means receiving said first A.C. signal and converting said first A.C. signal to a first D.C. signal,
   switching means responsive to said first D.C. signal and producing a first error signal when said first D.C. signal exceeds a predetermined value,
   phase load current sensing means connected with said load and producing a second A.C. signal representative of and proportional to said phase load current,
   second rectifying means receiving said second A.C. signal and converting said second A.C. signal to a second D.C. signal whose magnitude is proportional to said second A.C. signal,
   a first transistor receiving said second D.C. signal,
   a reference signal for biasing said first transistor whereby said first transistor conducts only when said second D.C. signal exceeds said reference signal,
   a second transistor which conducts in response to the conduction of said first transistor and producing a second error signal,
   positive feedback means receiving said second error signal and providing a feedback current to said first transistor whereby said first transsitor is driven towards greater conduction,
   circuit means responsive to either said first or second error signals for producing an output signal, and
   positive feedback means connected between the output and the input of said circuit means.
4. A protector circuit for a three-phase load as in claim 3 wherein said switching means includes
   conducting means responsive to said first D.C. signal and producing a first error signal when said first D.C. signal exceeds a predetermined maximum permissible value, and
   delay means interposed between said first rectifying means and said conducting means for effecting a time delay of said first D.C. signal.
5. A protector circuit for a three-phase load having a neutral point,
   means connected with said neutral point of said load for sensing a first A.C. signal at said neutral point,
   first rectifying means receiving said first A.C. signal and converting said first A.C. signal to a first D.C. signal, first switching means receiving said first D.C. signal and producing a first error signal when said first D.C. signal exceeds a predetermined value, phase load current sensing means connected with said load and producing a second A.C. signal representative of and proportional to said phase load current, second rectifying means receiving said second A.C. signal and converting said second A.C. signal to a second D.C. signal whose magnitude is proportional to said second A.C. signal, a first transistor receiving said second D.C. signal, a reference signal for biasing said first transistor whereby said first transistor conducts only when said second D.C. signal exceeds said reference signal, a second transistor which conducts in response to the conduction of said first transistor and producing a second error signal, positive feedback means connected to said second error signal for providing a feedback current to said first transistor whereby said first transistor is driven towards greater conduction, integrator means connected to said second error signal for producing a delay in said second error signal, a zener diode connected to said delayed second error signal and producing a third error signal when said delayed signal exceeds the breakdown voltage of said zener diode, third circuit means responsive to either said first or third error signals for producing an output signal, and positive feedback means connected between the output and the input of said third circuit means.

6. A protector circuit as in claim 5 in which said integrator means comprises a series resistor receiving said second error signal, a shunt capacitor connected to said resistor, said capacitor being charged by said second error signal to delay said second error signal, and a diode connected across said series resistor for providing a discharge path for said capacitor when said second transistor is rendered nonconductive.

References Cited by the Examiner

UNITED STATES PATENTS

| 2,309,433 | 1/1943 | Anderson | 317—27 |
| 2,700,124 | 1/1955 | Fritz | 317—27 |
| 2,875,382 | 2/1959 | Sandin et al. | 317—33 X |
| 2,920,242 | 1/1960 | Koss | 317—36 |
| 3,105,920 | 10/1963 | Dewy | 317—33 X |
| 3,107,318 | 10/1963 | Lytle | 317—18 X |

MILTON O. HIRSHFIELD, *Primary Examiner.*

SAMUEL BERNSTEIN, STEPHEN W. CAPELLI,
*Examiners.*

J. D. TRAMMELL, *Assistant Examiner.*